US011754221B2

(12) United States Patent
Gulick et al.

(10) Patent No.: US 11,754,221 B2
(45) Date of Patent: Sep. 12, 2023

(54) SECURITY APPARATUS FOR A GOLF LAUNCH MONITOR

(71) Applicant: Scorpion Security Products, Inc., Vestal, NY (US)

(72) Inventors: Grant William Gulick, Endwell, NY (US); Franklyn W. Gulick, Jr., Binghamton, NY (US); Gary R. Page, Chenango Forks, NY (US)

(73) Assignee: Scorpion Security Products, Inc., Vestal, NY (US)

( * ) Notice: Subject to any disclaimer, the term of this patent is extended or adjusted under 35 U.S.C. 154(b) by 0 days.

(21) Appl. No.: 17/554,535

(22) Filed: Dec. 17, 2021

(65) Prior Publication Data
US 2022/0196204 A1 Jun. 23, 2022

Related U.S. Application Data

(60) Provisional application No. 63/126,845, filed on Dec. 17, 2020.

(51) Int. Cl.
*F16M 11/00* (2006.01)
*F16M 13/02* (2006.01)
*F16M 11/04* (2006.01)
*F16B 23/00* (2006.01)
*A63B 69/36* (2006.01)

(52) U.S. Cl.
CPC ........ *F16M 13/022* (2013.01); *F16M 11/045* (2013.01); *A63B 69/36* (2013.01); *F16B 23/0007* (2013.01)

(58) Field of Classification Search
CPC .. F16M 13/022; F16M 11/045; F16M 11/425; A63B 69/36; A63B 24/0003; F16B 23/0007; F16B 5/0614; F16B 9/054
See application file for complete search history.

(56) References Cited

U.S. PATENT DOCUMENTS

| 1,011,707 | A | * | 12/1911 | Ankeny | A47B 23/042 248/447.2 |
| 1,590,726 | A | * | 6/1926 | Corsgren | A47B 23/04 108/49 |
| 1,685,041 | A | * | 9/1928 | Binkele | A47B 23/02 248/447.2 |
| 9,949,561 | B2 | * | 4/2018 | Aldrich | F16M 13/00 |
| 2005/0041966 | A1 | * | 2/2005 | Johnson | G03B 17/566 396/428 |
| 2019/0376639 | A1 | * | 12/2019 | Bowman | F16M 11/24 |

* cited by examiner

*Primary Examiner* — Amy J. Sterling
(74) *Attorney, Agent, or Firm* — Barclay Damon LLP

(57) ABSTRACT

A security apparatus for a launch monitor comprises a guide member extending from a first end to a second end. The guide member comprises a top surface defining one or more top surface features, and opposing side surfaces defining one or more side surface features. A mount is configured to moveably couple to the guide member. The mount comprises a mount body, and a plurality of securing members. Each of the securing members includes a retainer configured to retain and secure a portion of the launch monitor to the mount body and enable the launch monitor to be moved relative to the guide member.

14 Claims, 13 Drawing Sheets

SECURITY APPARATUS FOR A GOLF LAUNCH MONITOR

CROSS-REFERENCE TO RELATED APPLICATIONS

Pursuant to relevant portions of 35 U.S.C. § 119 and 37 C.F.R. § 1.53, this application claims the benefit and priority of U.S. Patent Application 63/126,845, filed on Dec. 17, 2020, the entire contents of which is hereby incorporated by reference.

TECHNOLOGICAL FIELD

This disclosure relates generally to the field of security apparatuses used to secure electronic devices and more specifically a security apparatus used to functionally secure a golf launch monitor.

BACKGROUND

Many types of specialized devices have been developed to assist in golf practice and player development. One such device is the golf launch monitor system. The golf launch monitor system generally consists of a golf launch monitor that is used in conjunction with monitoring software. The golf launch monitoring system enables the mapping of a player's golf swing, the comparison of different golf swings, and the monitoring of granular changes in a player's golf swing. Such golf launch monitoring systems are used in a variety of settings including country clubs, retail outlets, teaching facilities, and equipment development and testing facilities.

In order to use the golf launch monitoring system, the golf launch monitor is positioned at various locations relative to the golfer in order to monitor the golfer's swing at a desired perspective or for specific characteristics. Accordingly, proper use of the golf launch monitoring system requires the ability to move the launch monitor to accommodate different golfer's and to collect different data from the same golfer. The data collected by the golf launch monitor is transmitted to a remote processor where it can be compiled and analyzed by a software application.

While these golf launch monitoring systems are incredibly power practice tools that can improve a golfer's game, these systems and specifically the launch monitors themselves, are very expensive, which makes them a prime target for theft. As a result, the launch monitor is usually removed from the practice area in between uses and locked away in a secure place. This requires additional time to setup the launch monitoring system in between uses as the launch monitor must be obtained from the secure place, connected to the processor (either wirelessly or via a hard connection), and repositioned in the monitoring area. Alternatively, the monitoring area itself may be a secured place that is locked when not in use. This requires additional security measures such as the hardware to secure the monitoring area (e.g., locks on doors/windows) and an access protocol to determine which individuals will have access to the monitoring area.

These are just some of the problems associated with securing golf launch monitoring systems and golf launch monitors.

SUMMARY

An embodiment of a security apparatus for a launch monitor is provided and comprises a guide member extending from a first end to a second end. The guide member includes a top surface defining one or more top surface features and opposing side surfaces defining one or more side surface features. The security apparatus further includes a mount including a mount body extending along a plane that intersects a vertical axis at an angle. The mount has a top body surface and a bottom body surface. A plurality of clamp members are positioned on a top body surface and each include a retainer configured to retain and secure a portion of the launch monitor to the mount body. At least one slide member is positioned on the bottom body surface and engages at least one of: (1) the top surface features; and (2) the one or more side surface features to couple the mount to the guide member. The at least one slide member enables the mount to move relative to the guide member and between the first and second end of the guide member.

In an embodiment, the guide member includes at least one bracket configured to secure the guide member to an anchoring fixture. In an embodiment, the plurality of clamp members are configured to move relative to the mount body when in an unlocked state and are inhibited from moving relative to the mount body when in a locked state. In another embodiment, the mount is configured to pivot relative to a vertical axis such that the angle between the plane of the mount and the vertical axis is adjustable. In an embodiment, the clamp members are connected to the mount body using one or more coupling elements. In a further embodiment, the security apparatus further includes a covering formed from a plurality sides and defining an interior space, wherein the covering is configured to connect to the mount.

Another embodiment of the security apparatus comprises a guide member extending along a guide member axis and comprising a top surface and opposing side surfaces, wherein at least one of the top surface and the opposing side surfaces define one or more surface features. The security apparatus further includes a mount configured to moveably couple to the guide member. The mount includes a body having a top body surface and a bottom body surface, and a plurality of securing members positioned on the top body surface. Each of the plurality of securing members is configured to retain and secure a portion of the launch monitor to the mount body. The mount is configured to move relative to the guide member along the guide member axis.

The above embodiments are exemplary only. Other embodiments are within the scope of the disclosed subject matter.

BRIEF DESCRIPTION OF DRAWINGS

A more particular description of the invention briefly summarized above may be had by reference to the embodiments, some of which are illustrated in the accompanying drawings. It is to be noted, however, that the appended drawings illustrate only typical embodiments of this invention and are therefore not to be considered limiting of its scope, for the invention may admit to other equally effective embodiments. Thus, for further understanding of the nature and objects of the invention, references can be made to the following detailed description, read in connection with the drawings in which.

DETAILED DESCRIPTION

The following discussion relates to various embodiments of a security apparatus for a golf launch monitor. It will be understood that the herein described versions are examples that embody certain inventive concepts as detailed herein. To that end, other variations and modifications will be readily apparent to those of sufficient skill. In addition, certain terms are used throughout this discussion in order to provide a suitable frame of reference with regard to the accompanying drawings. These terms such as "upper", "lower", "forward", "rearward", "interior", "exterior", "front", "back", "top", "bottom", "inner", "outer", "first", "second", and the like are not intended to limit these concepts, except where so specifically indicated. The terms "about" or "approximately" as used herein may refer to a range of 80%-125% of the claimed or disclosed value. With regard to the drawings, their purpose is to depict salient features of the security apparatus for a golf launch monitor and are not specifically provided to scale.

Figure 1A:
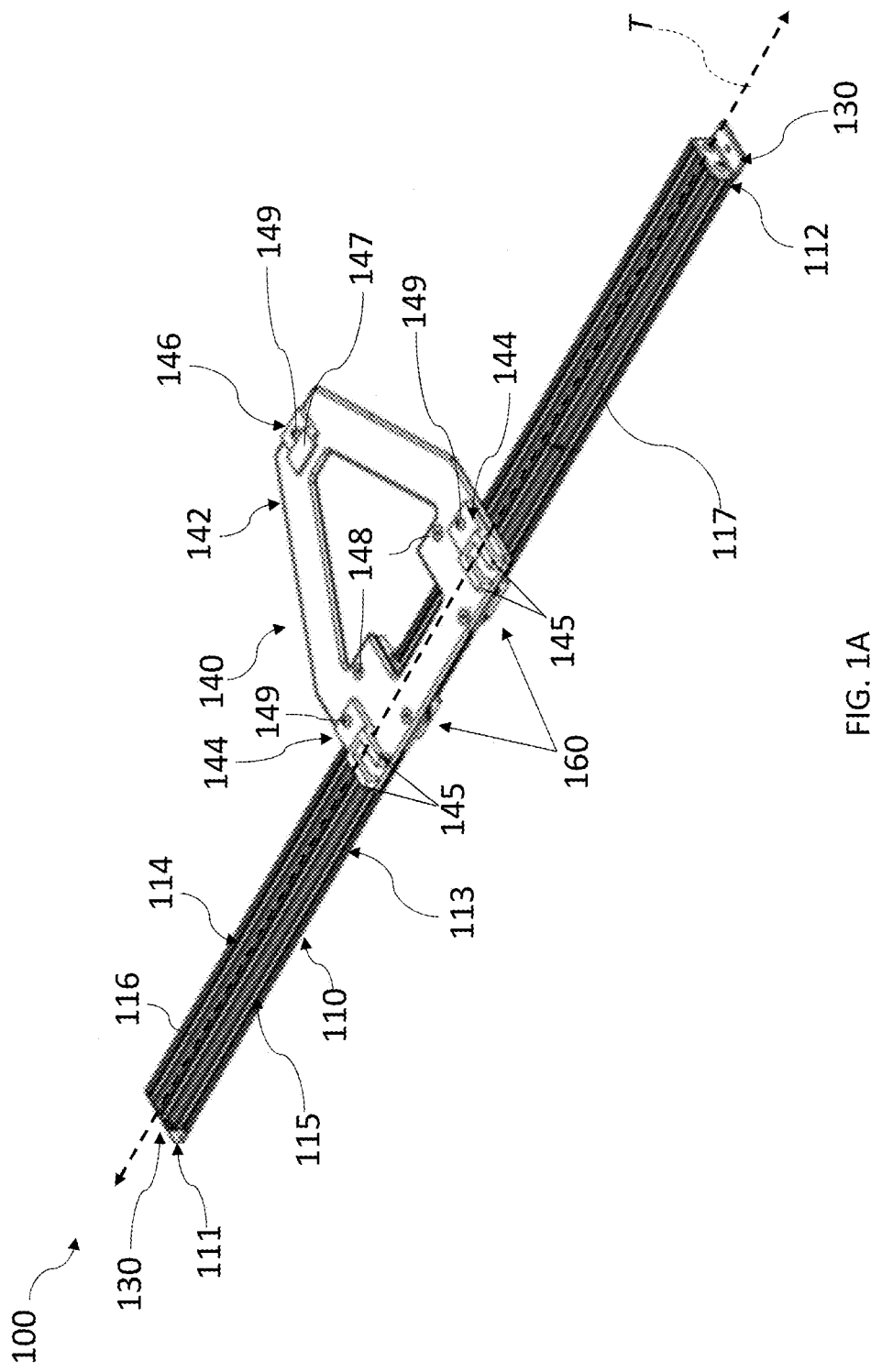
FIG. 1A illustrates a front perspective view of an embodiment of a security apparatus for a launch monitor.
Figure 1B:
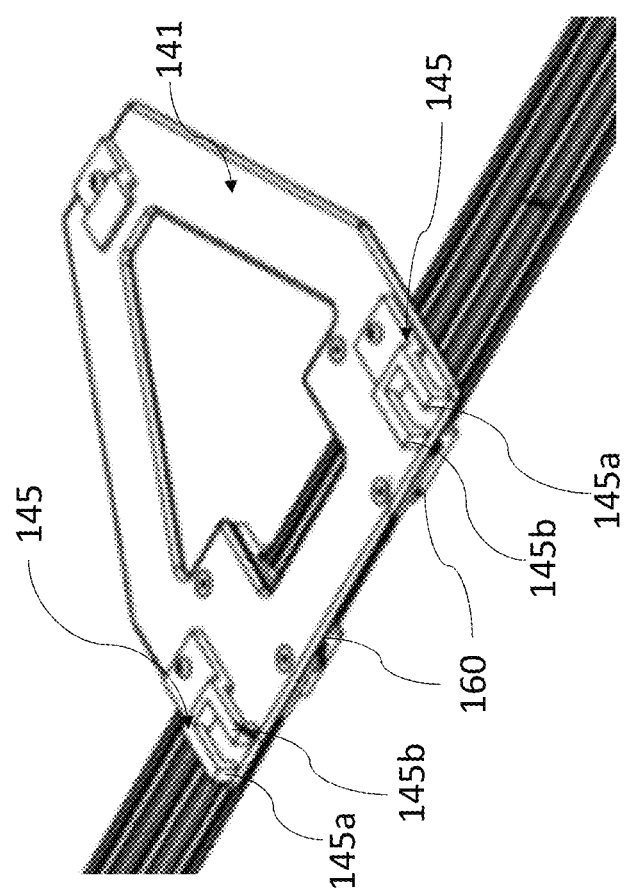
FIG. 1B illustrates a close-up view of the embodiment of FIG. 1A.
Figure 2:
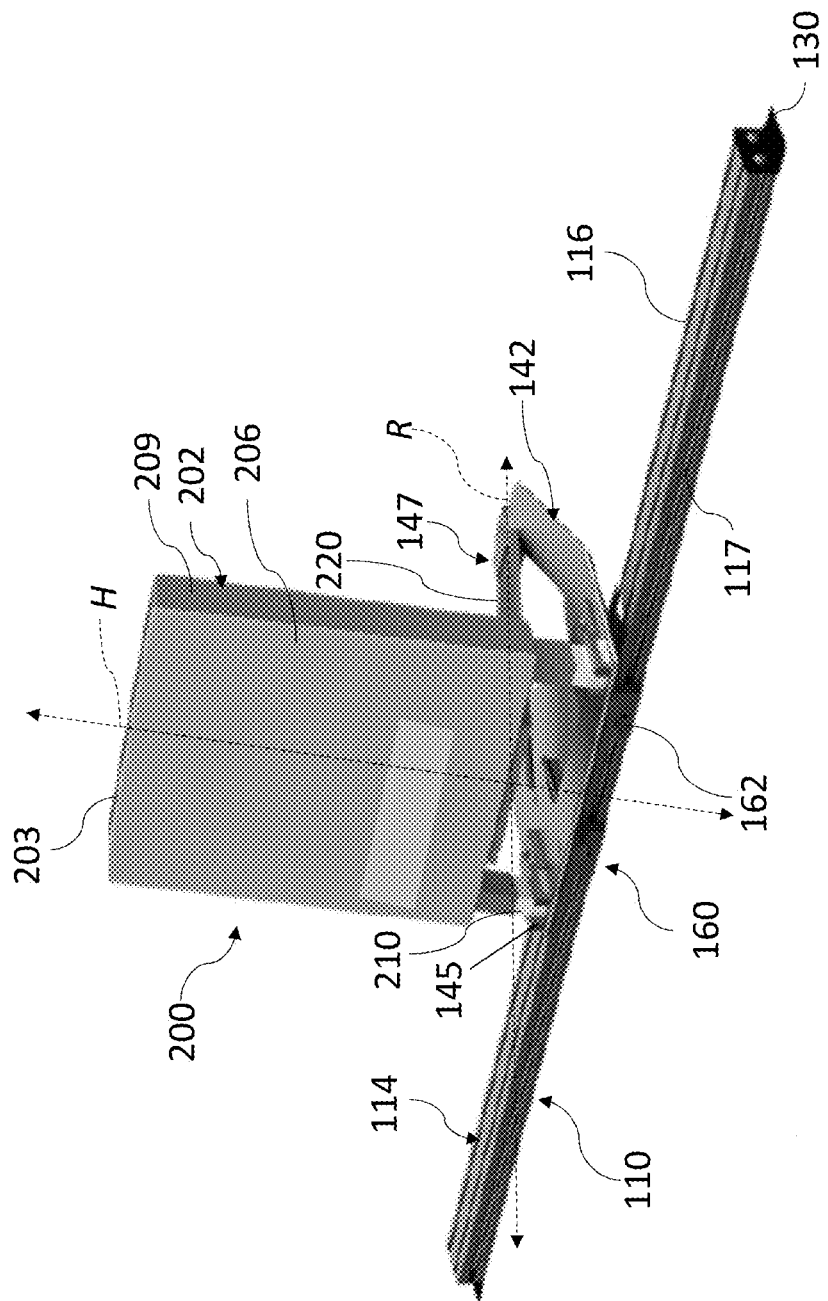
FIG. 2 illustrates a front perspective view of an embodiment of the security apparatus for a launch monitor with an embodiment of a launch monitor being secured.
Figure 3:
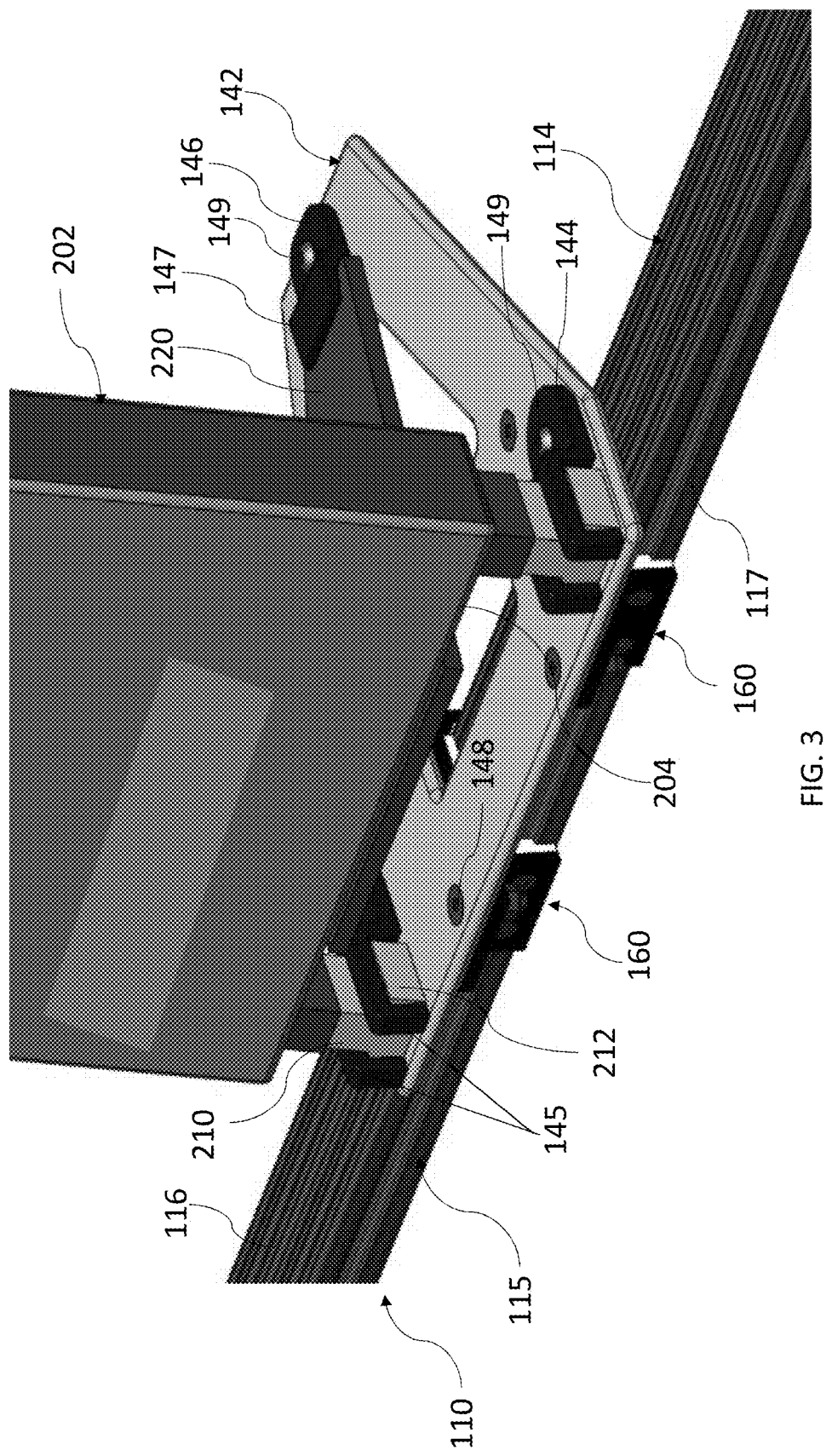
FIG. 3 illustrates a close-up view of a portion of the embodiment of FIG. 2.

Referring to FIGS. 1A-B, the security apparatus 100 for a golf launch monitor or launch monitor 200 generally includes a track or guide member 110 and a mount 140 moveably coupled to the guide member 110 using one or more guide engagers 160, such as slide members.

The guide member 110 extends along a guide axis T from a first end 111 to a second end 112. The guide member 110 includes a top surface 114, an opposing bottom surface 113, and side surfaces 115. The top surface 114 may define one or more top surface features 116 and the side surfaces 115 may define one or more side surface features 117. In an embodiment, the one or more top surface features 116 include a groove, a channel, and/or a ridge extending between the first end 111 and the second end 112 of the guide member 110. In an embodiment, the one or more side surfaces 115 include a groove, a channel, and/or a ridge extending along the one or more side surfaces 115. In some embodiments, the bottom surface 113 of the guided member 110 may define one or more bottom surface features (not shown). The guide member 110 may be secured to an anchoring fixture (such as a wall, a floor, a display fixture) using one or more brackets 130.

Figure 11:
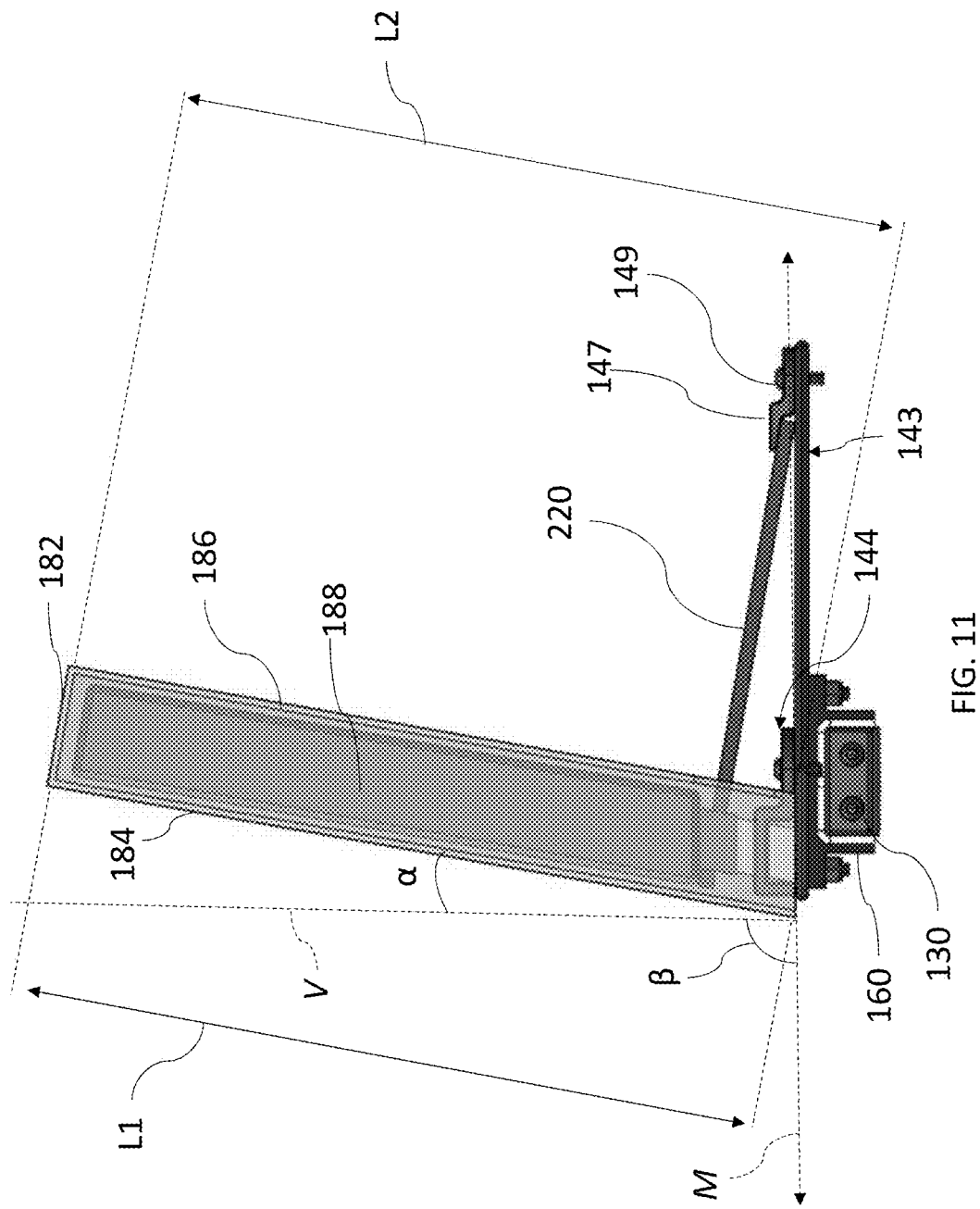
FIG. 11 illustrates the embodiment of the security apparatus for a launch monitor of FIG. 4 further including an embodiment of a protective covering installed over the launch monitor.

Still referring to FIGS. 1A-B, the mount 140 includes a body 142 that extends along a mount plane M (see FIG. 11) with a top body surface 141 having a plurality of securing members, such as clamp members 144, 146, and a bottom body surface 143 (see FIG. 11). The mount plane M intersects a vertical axis V at an angle β (see FIG. 8). As shown, the body 142 is generally planar, however the geometric characteristics of the body 142 and the number of clamp members 144, 146 present may vary depending on the shape of the launch monitor 200 and/or the guide member 110 and/or characteristics of the monitoring area where the security apparatus 100 is installed. The embodiment of the mount 140 shown in FIGS. 1-5 includes a plurality of securing members. As shown, the securing members include two (2) forward clamp members 144 and one (1) rear clamp member 146. The rear clamp member 146 includes a retainer 147 and a coupling element 149 that couples the rear clamp member 146 to the mount 140. The forward clamp members 144 include a retainer 145 and a coupling element 149 that couples the forward clamp members 144 to the body 142 of the mount 140. As shown, the retainers 145 of the forward clamp members 144 are split retainers 145 that comprise two (2) retaining portions 145a, 145b. In an embodiment, the coupling element 149 is a mechanical fastener such as a nut-and-bolt or screw-and-nut combination, or a threaded fastener. In an embodiment, the threaded fastener may be configured to be installed and uninstalled using a proprietary tool. In this embodiment, the threaded fastener is a security screw or tamper-proof screw that has a unique screw head that makes removal nearly impossible without the corresponding proprietary tool.

The mount 140 is attached to one or more guide engagers 160 that enable the mount 140 to be installed onto the guide member 110. As shown, the guide engagers 160 comprise sliders 162 that engage at least the top surface features 116 and the side surface features 117 of the guide member 110. As shown, each slider 162 engages the top surface features 116 and the side surface features 117. Each slider 162 couples to the mount 140 using one or more coupling elements 148. These coupling elements 148 may be similar to the coupling elements 149 of the clamp members 144, 146. The coupling elements 148 enable the clamp members 144, 146 to be moved between an unlocked state where the clamp members 144, 146 are able to move relative to the mount 140, and a locked state, where the clamp members 144, 146 are inhibited from moving relative to the mount 140. In an embodiment, the mount 140 and the guide engagers 160 may be coupled through one or more welded joints. In another embodiment, the mount 140 and the guide engagers 160 may be formed as a single component. Alternatively, a lock mechanism can be included which secures the mount 140 to the one or more guide engagers 160 and can be unlocked in order to decouple the mount 140 and the one or more guide engagers 160.

Figure 6:
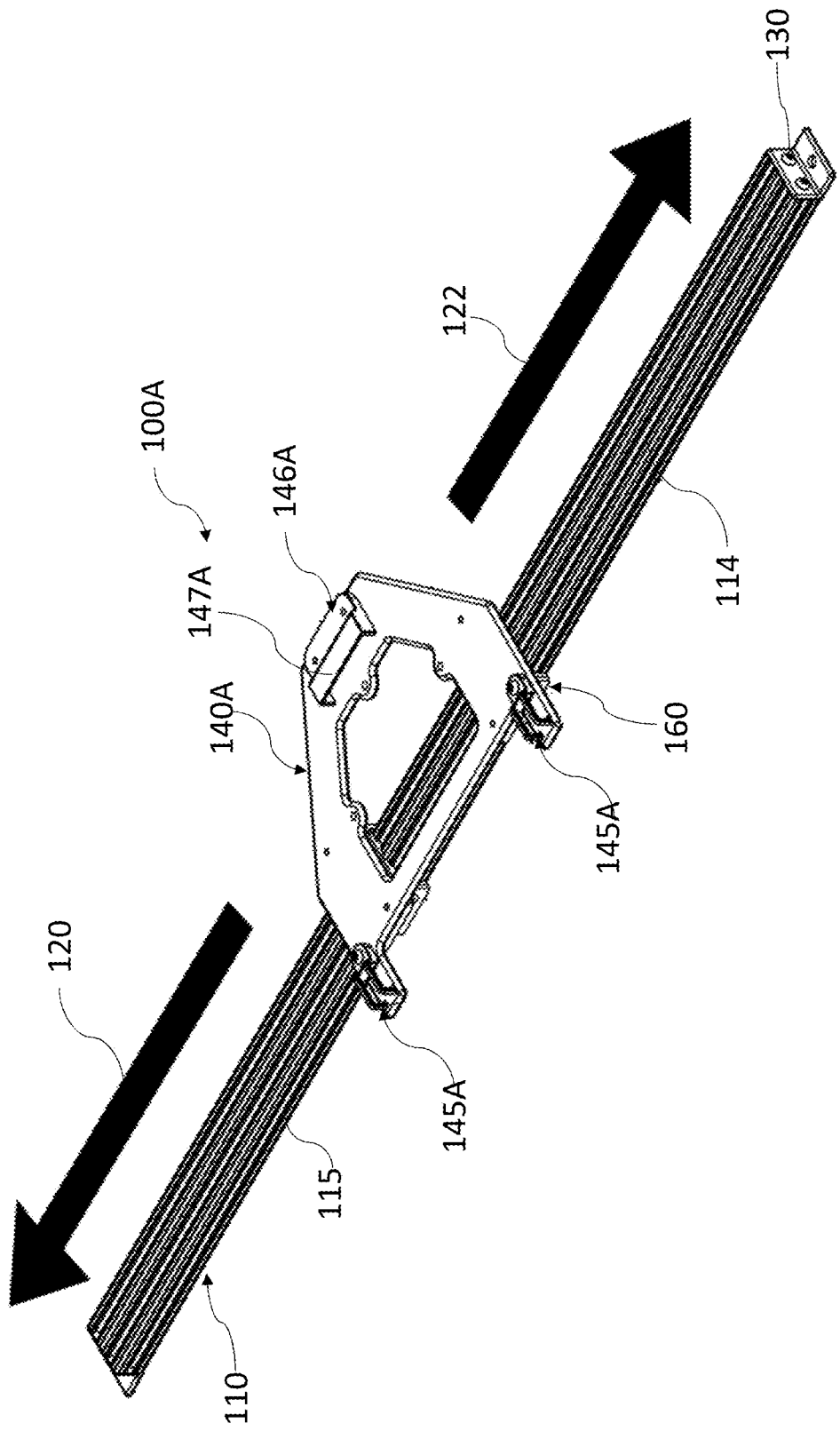
FIG. 6 illustrates a top perspective view of another embodiment of the security apparatus for a launch monitor.
Figure 7:
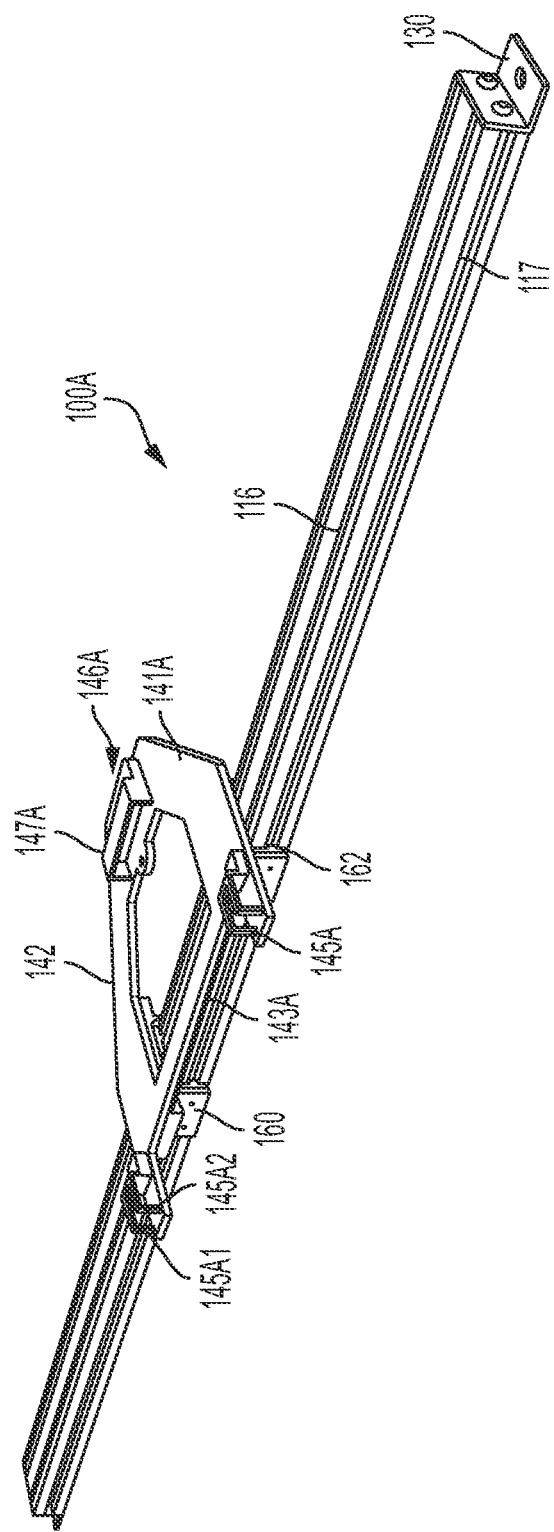
FIG. 7 illustrates a top perspective view of the embodiment of the security apparatus for a launch monitor of FIG. 6.
Figure 8:
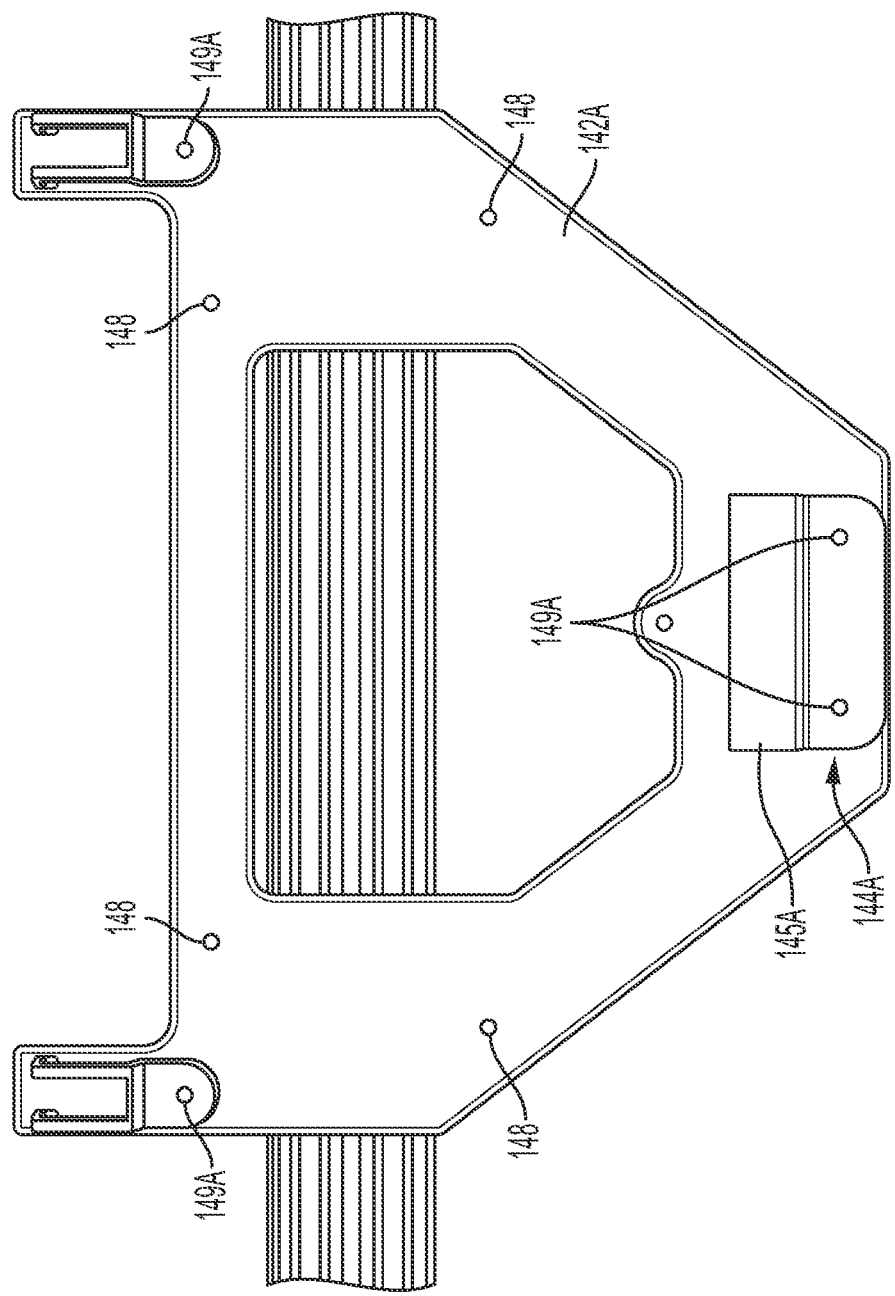
FIG. 8 illustrates an enlarged top view of a portion of the embodiment of the security apparatus for a launch monitor of FIGS. 6-7.

Another embodiment of the security apparatus 100A is shown in FIGS. 6-8. Several of the elements of this embodiment may be similar or the same as previously disclosed embodiments. This embodiment includes a mount 140A with a body 142A that extends along a mount plane M (see FIG. 11). The body 142A further includes a top body surface 141A having a plurality of securing members, such as clamp members 144A, 146A, and a bottom body surface 143A. The mount plane M intersects a vertical axis V at an angle β such as shown in FIG. 11. As shown, the body 142A is generally planar, however the geometric characteristics of the body 142A and the number of clamp members 144A, 146A present may vary depending on the shape of the launch monitor 200 and/or the guide member 110 and/or characteristics of the monitoring area where the security apparatus 100A is installed. The mount 140A includes a plurality of securing members. As shown, the securing members include two (2) forward clamp members 144A and one (1) rear clamp member 146A. The rear clamp member 146A includes a retainer 147A and at least one securing element 149A that couples the rear clamp member 146A to the mount 140A. The forward clamp members 144A include a retainer 145A and at least one securing element 149A that couples the forward clamp members 144A to the body 142A of the mount 140A. As shown, the retainers 145A of the forward clamp members 144A are split retainers 145A that comprise two (2) retaining portions 145A1, 145A2. In an embodiment, the securing elements 149A is a mechanical fastener such as a nut-and-bolt or screw-and-nut combination, or a threaded fastener. In an embodiment, the threaded fastener may be configured to be installed and uninstalled using a proprietary tool. In this embodiment, the threaded fastener is a security screw or tamper-proof screw that has a unique screw head that makes removal nearly impossible without the corresponding proprietary tool.

The mount 140A is similarly attached to one or more guide engagers 160 as in previously described embodiments that enable the mount 140A to be installed onto the guide member 110. As shown, the guide engagers 160 comprise sliders 162 that engage at least the top surface features 116 and the side surface features 117 of the guide member 110. As shown, each slider 162 engages the top surface features 116 and the side surface features 117 to enable the mount 140A to move in a first direction 120 relative to the guide member 110, and a second, opposing 122 relative to the guide member 110. Each slider 162 couples to the mount 140A using one or more coupling elements 148. These coupling elements 148 may be similar to the securing elements 149A of the clamp members 144A, 146A. The securing elements 149A enable the clamp members 144A, 146A to be moved between an unlocked state where the clamp members 144A, 146A are able to move relative to the mount body 142A, and a locked state, where the clamp members 144A, 146A are inhibited from moving relative to the mount body 142A. When the in an embodiment, the mount 140 and the guide engagers 160 may be coupled through one or more welded joints. In another embodiment, the mount 140 and the guide engagers 160 may be formed as a single component. Alternatively, a lock mechanism can be included which secures the mount 140A to the one or more guide engagers 160 and can be unlocked in order to decouple the mount 140A and the one or more guide engagers 160.

A launch monitor 200 is shown as being installed or secured by the security apparatus 100 FIGS. 2-5. The embodiment of the launch monitor 200 shown generally includes a housing 202 having a top surface 203, a bottom surface 204, a front facing surface 206, a rearward facing surface 208, and side surfaces 207, 209. The housing 202 as shown further includes two (2) legs 210 extending from the bottom housing surface 204 along a housing axis H. A leg base 212 is provided that has a greater diameter than the leg 210. A rear support 220 extends from the bottom housing surface 204 along a rear support axis R that intersects the housing axis H.

Installation of the launch monitor 200 will now be described with reference to the embodiment of the security apparatus 100 shown in FIGS. 1A-5, however many aspects, if not all aspects, of this installation are the same for the embodiment of the security apparatus 100A shown in FIGS. 6-8. To install the launch monitor 200 onto the security apparatus 100, the coupling elements 149 of the forward and rear clamp members 144, 146 are loosened such that the retainers 145, 147 may be lifted and/or otherwise moved with respect to the body 142. The rear support 220 may be slid under the retainer 147 of the rear clamp member 146. The retainers 145 of the forward clamp members 144 may be lifted up relative to the body 142 to enable the legs 210 of the launch monitor 200 to be positioned under the retainers 145. These retainers are split retainers 145 as previously mentioned such that the retaining portions 145a, 145b at least partially surround the leg 210 and act to contact and retain the leg base 212 on the body 142 of the mount 140. The coupling elements 149 are then tightened to secure the forward clamp members 144 and the rear clamp member 146 onto the legs 210 and rear support 220, respectively. The launch monitor 200 is now secured to the mount 140 of the security apparatus 100, which is in turn movably secured to the guide member 110 of the security apparatus 100 via the guide engagers 160.

Figure 4:
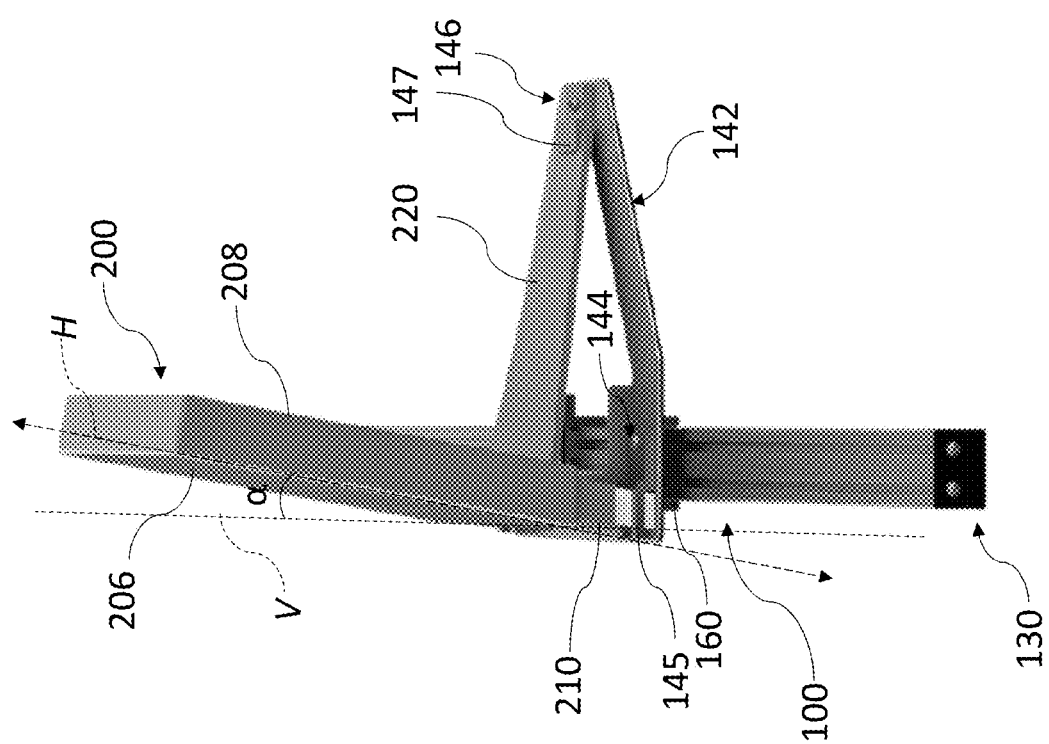
FIG. 4 illustrates a side perspective view of an embodiment of the security apparatus for a launch monitor with an embodiment of a launch monitor being secured.
Figure 5:
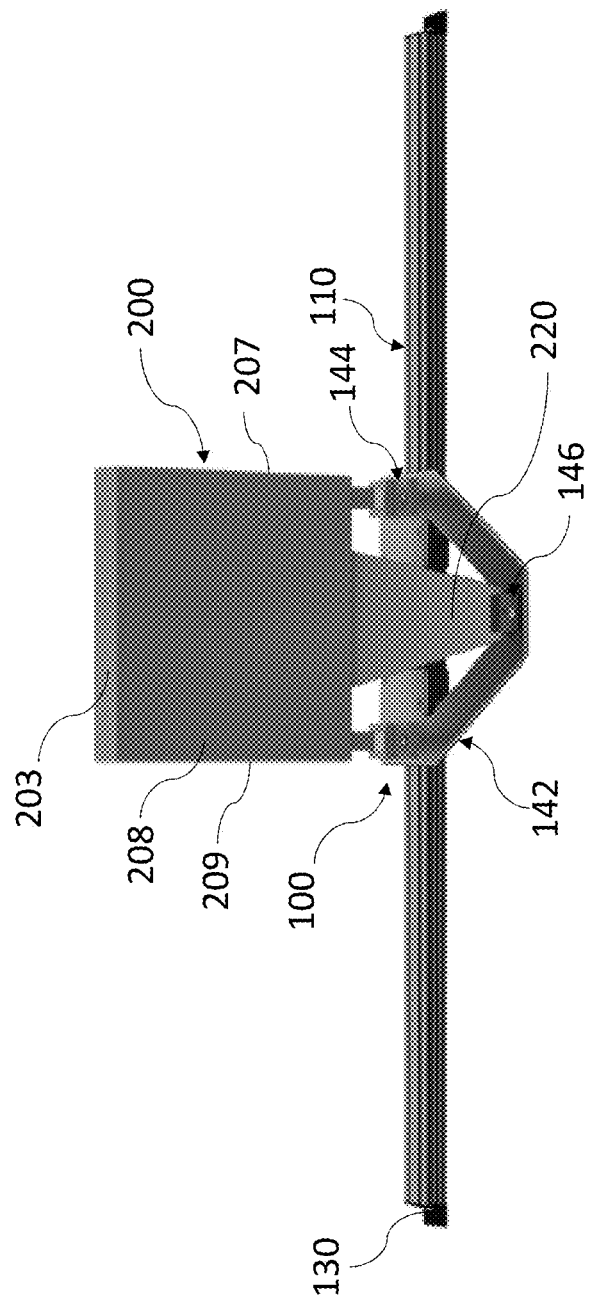
FIG. 5 illustrates a rear perspective view of an embodiment of the security apparatus for a launch monitor with an embodiment of a launch monitor being secured.

When the launch monitor 200 is secured to the mount 140, which is moveably secured to the guide member 110, the launch monitor 200 is capable of moving or sliding relative to the guide member 110 along the guide member axis T. The guide member 110 is secured to a fixture (not shown) or the ground by the brackets 130, which prevent the sliders 160 from sliding off either the first or second end 111, 112 of the guide member 110. Since the guide member 110 is fixedly secured by the brackets 130, the launch monitor 200 is protected against theft while being able to be positioned relative to a golfer in order to obtain data pertaining to the golfer's swing and transmit the data to a remote processor for further analysis. Therefore, there is no need to remove the launch monitor 200 from the security apparatus 100 between uses or to further secure the monitoring area where the launch monitor 200 is being used. In addition and as can be seen in FIG. 4, when the launch monitor 200 is secured by the security apparatus 100, the front surface 206 extends along the housing axis H, which is positioned at an angle α relative to the vertical plane V so that the launch monitor 200 is properly oriented relative to the vertical plane V to monitor and obtain data from the golfer. In another embodiment, the guide engagers further include a pivot member that enables the mount 140 to be pivoted relative to the guide member 110 in order to move the housing axis H relative to the vertical plane V. In other words, as shown in FIG. 8, the body 142 of the mount 140 may be pivoted relative the vertical axis V so as to change the value of the angle β at which the mount plane M intersects the vertical axis V.

In a further embodiment, the guide engagers 160 may surround the track and engage one or more bottom surface features (not shown). In another embodiment, the guide engagers 160 may be configured to be removed from the track 110 without detaching the bracket(s) 130 from the fixture (not shown) or the ground. In an embodiment, the mount 140 is configured for a snap-fit engagement with the one or more guide engagers 160 and further configured to be removed from the one or more guide engagers 160 without the use of tools. In another embodiment, one of the brackets 130 may be configured to be unlocked in order to enable removal of the one or more guide engagers 160 from an end of the track 110 without decoupling the track 110 from the fixture (not shown) or the ground.

Referring to the security apparatus 100A shown in FIGS. 6-8, the forward and rear clamp members 144A, 146A have retainers 145A, 147A that are configured to enable the launch monitor 200 to be adjusted vertically while being secured by the security apparatus 100A. As such, the retainers 145A, 147A and retaining portions 145A1, 145A2 are dimensioned to enable some flexibility in adjusting the launch monitor 200 while still being secured by the security apparatus 100A.

Referring generally to FIGS. 9-12, the security apparatus 100 may further comprise a covering 180 or sleeve that fits over the launch monitor 200 when it is being retained or secured by the security apparatus 100. The covering 180 is generally formed from a plurality of sides and define an interior space 189 that is dimensioned to accommodate the launch monitor 200. As shown, the covering 180 includes a top cover surface 182, a bottom cover surface 183, a front cover surface 184, a rear cover surface 186, and opposing side cover surfaces 188. The bottom cover surface 183 may define an opening or passage 187 into the interior space 189.

Figure 9:
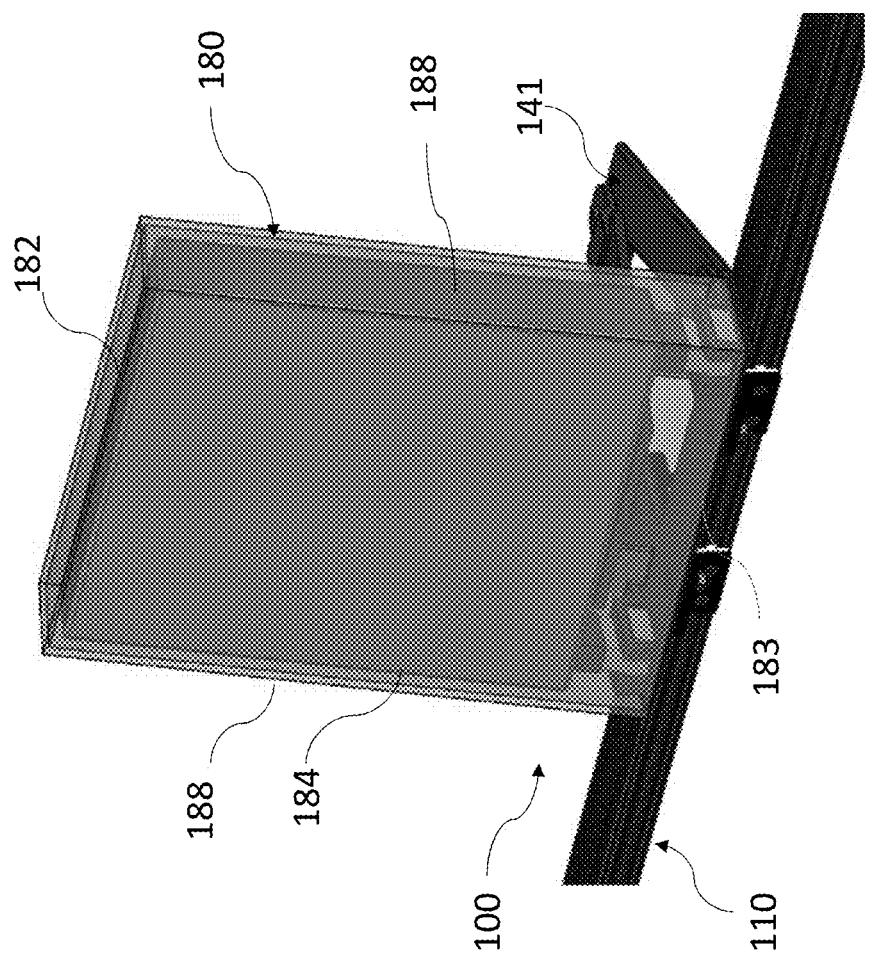
FIG. 9 illustrates the embodiment of the security apparatus for a launch monitor of FIG. 2 further including an embodiment of a protective covering installed over the launch monitor.
Figure 10:
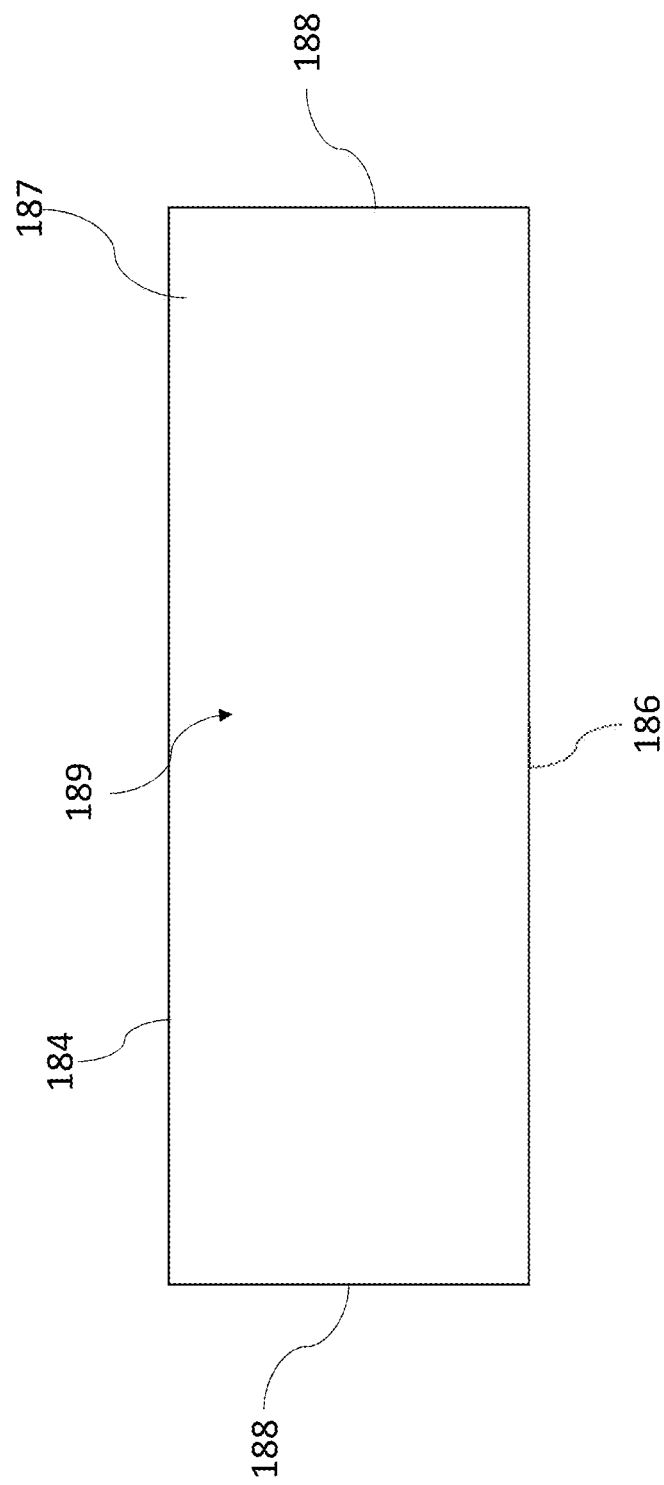
FIG. 10 illustrates a bottom schematic view of an embodiment of the protective covering.

The covering 180 is dimensioned to be slid over the launch monitor 200 while the launch monitor 200 is secured by the security apparatus 100, or when the launch monitor 200 is detached from the security apparatus 100. In an embodiment, the covering 180 may engage the launch monitor and/or a part of the security apparatus 100 via a snap-fit between complimentary surfaces or surface features on the covering 180 and the part of the launch monitor 200 and/or the security apparatus 100. As shown in FIG. 11, the front cover surface 184 of the covering 180 has a length L1 that is greater than the length L2 of the rear cover surface 186. As a result, the front surface 184 of the covering 180 is also positioned at an angle α relative to the vertical plane V. The rear cover surface 186 as shown in FIG. 9 may define one or more openings or cut-outs 181 to accommodate one or more features of the security apparatus 100 and/or the launch monitor 200. In an embodiment, the one or more cut-outs may correspond to power and/or data connections to the launch monitor 200. The covering may be comprised of a poly carbonate material that protects the launch monitor from kicking or strikes from a golf ball or golf club.

Figure 12:
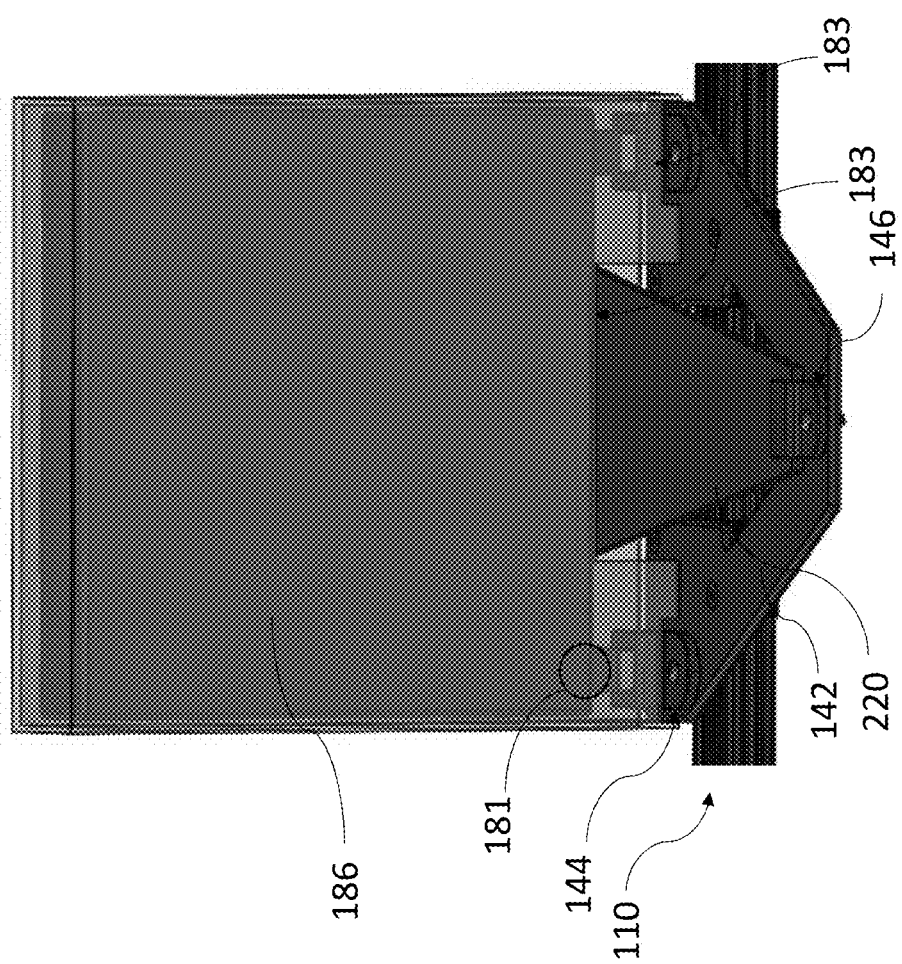
FIG. 12 illustrates the embodiment of the security apparatus for a launch monitor of FIG. 5 further including an embodiment of a protective covering installed over the launch monitor.

The embodiments of the covering 180 depicted in FIGS. 9, 11, and 12, show the launch monitor 200 in phantom for the purposes of illustrating the fit of the covering 180 and does not necessarily imply that the covering 180 is transparent or translucent. The covering 180 may include fewer or more sides and fewer or more openings or cut-outs in order to accommodate different launch monitors. In an embodiment, the covering 180 cooperates with a locking device in order to lock the covering 180 onto the security apparatus 100 and/or launch monitor 200. The locking device may require a mechanical input, such as a key, to move the locking device between a locked and an unlocked state. In an embodiment, the locking device may require a biometric input to move the locking device between a locked and an unlocked state.

One or more components of the security apparatus 100 and the protective covering 180 may be colored (e.g., Safety Yellow) so that they stand out and may be comprised of a metal, such as one or more forms of steel, aluminum, zinc, or a rigid plastic or polycarbonate material.

While the present invention has been particularly shown and described with reference to certain exemplary embodiments, it will be understood by one skilled in the art that various changes in detail may be effected therein without departing from the spirit and scope of the invention that can be supported by the written description and drawings. Further, where exemplary embodiments are described with reference to a certain number of elements, it will be understood that the exemplary embodiments can be practiced utilizing either less than or more than the certain number of elements.

The invention claimed is:

1. A security apparatus for a launch monitor comprising:
a guide member extending from a first end to a second end and comprising,
a top surface defining one or more top surface features, and
opposing side surfaces defining one or more side surface features;
a mount comprising,
a mount body extending along a plane that intersects a vertical axis at an angle, the mount comprising a top body surface and an opposing bottom body surface,
a plurality of clamp members positioned on the top body surface, each of the plurality of clamp members including a retainer configured to retain and secure a portion of the launch monitor to the mount body, and
at least one slide member positioned on the opposing bottom body surface and configured to engage at least one of: (1) the top surface features; and (2) the one or more side surface features to couple the mount to the guide member, wherein the at least one slide member is configured to enable the mount to move relative to the guide member and between the first and second end of the guide member.

2. The security apparatus according to claim 1, wherein the guide member includes at least one bracket configured to secure the guide member to an anchoring fixture.

3. The security apparatus according to claim 1, wherein the plurality of clamp members are configured to move relative to the mount body when in an unlocked state and wherein the plurality of clamp members are inhibited from moving relative to the mount body when in a locked state.

4. The security apparatus according to claim 1, wherein the mount is configured to pivot relative to the vertical axis to adjust the angle.

5. The security apparatus according to claim 1, wherein the clamp members are connected to the mount body using one or more coupling elements.

6. The security apparatus according to claim 1, further comprising a covering formed from a plurality sides and defining an interior space, wherein the covering is configured to connect to the mount.

7. A security apparatus comprising:
a guide member extending along a guide member axis and comprising,
a top surface, and
opposing side surfaces, wherein at least one of the top surface and the opposing side surfaces define one or more surface features; and
a mount configured to moveably couple to the guide member, the mount comprising,
a body comprising a top body surface and an opposing bottom body surface, and
a plurality of securing members positioned on the top body surface, wherein each of the plurality of securing members is configured to retain and secure a portion of a launch monitor to the body, wherein the opposing bottom body surface of the mount is configured to moveably engage the guide member, wherein the mount is configured move relative to the guide member along the guide member axis.

8. The security apparatus of claim 7, further comprising at least one slide member positioned on the opposing bottom body surface of the mount and configured to engage at least one of: (1) the top surface features; and (2) the one or more side surface features in order to couple the mount to the guide member.

9. The security apparatus of claim 8, wherein the at least one slide member is configured to enable the mount to move relative to the guide member and along the guide member axis.

10. The security apparatus according to claim 7, wherein the guide member includes at least one bracket configured to secure the guide member to an anchoring fixture.

11. The security apparatus according to claim 7, wherein the plurality of securing members are configured to move relative to the mount body when in an unlocked state and wherein the plurality of securing members are inhibited from moving relative to the body when in a locked state.

12. The security apparatus according to claim 7, wherein the mount extends along a mount plane that intersects a vertical axis at an angle, and wherein the mount is configured to pivot relative to the vertical axis to adjust the angle.

13. The security apparatus according to claim 1, wherein the plurality of securing members are connected to the mount body using one or more coupling elements.

14. The security apparatus according to claim 7, further comprising a covering formed from a plurality sides and defining an interior space, wherein the covering is configured to connect to the mount.

* * * * *